F. WILCOX.
JAR HOLDING AND SPACING MEANS.
APPLICATION FILED JUNE 23, 1913.

1,105,734.

Patented Aug. 4, 1914.

Witnesses

Inventor,
FRANK WILCOX,
attorney.

UNITED STATES PATENT OFFICE.

FRANK WILCOX, OF CEDAR FALLS, IOWA.

JAR HOLDING AND SPACING MEANS.

1,105,734. Specification of Letters Patent. Patented Aug. 4, 1914.

Application filed June 23, 1913. Serial No. 775,352.

*To all whom it may concern:*

Be it known that I, FRANK WILCOX, a citizen of the United States of America, and a resident of Cedar Falls, Blackhawk county, Iowa, have invented certain new and useful Improvements in Jar Holding and Spacing Means, of which the following is a specification.

Figure 1:
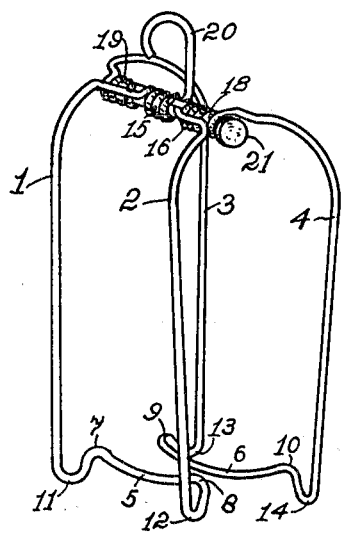
Figure 2:
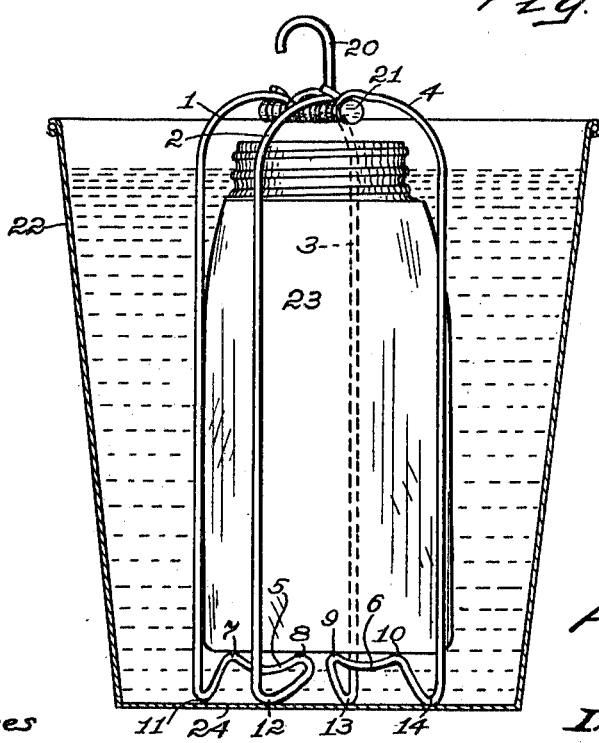

My invention relates to jar-holding and spacing-means, and the object of my improvement is to provide a device for detachably inclosing and holding fruit-jars and the like, with means for supporting the bottom of the jar in spaced relation to the bottom of the receptacle in which the jar is immersed in a heated medium, to thereby prevent breakage of the glass due to unequal conduction of heat, while also permitting of the ready and safe immersion of the jar and its equally safe withdrawal. This object I have accomplished by the means which are hereinafter described and claimed, and which are illustrated in the accompanying drawings, in which:

Figure 1 is a perspective view of my said improved jar-holding and spacing-means. Fig. 2 is a sectional view of a receptacle containing a liquid in which is immersed a jar held and supported by my said device in spaced relation to the bottom of the receptacle.

Similar numerals of reference denote corresponding parts throughout the several views.

It is well known that glass fruit-jars containing fruits or other substances to be preserved, when immersed in boiling-water, and placed therein so that their bottoms come directly in contact with the supporting bottom of the receptacle, often are shattered because of the unequal contraction of the glass due to the differential heat conduction from the water and from the vessel-bottom. I have therefore supplied means for safely inclosing and spacing the jar from the bottom of its receptacle, which will prevent such damage.

My device comprises two pairs of oppositely-located and spaced clips, each consisting of a U-shaped wire whose standards or vertical members 1—2, and 3—4 are respectively integrally connected at the bottom by cross-connections 5 and 6. The members 1 and 2 are abruptly bent into loops 11 and 12, the other members 3 and 4 likewise being bent into the loops 13 and 14, and reversed loops 7 and 8, and 9 and 10 are then formed in said members respectively the latter loops being then connected by the cross-parts 5 and 6, which latter parts are curved or bowed downwardly so as to leave the loops 7 and 8, and 9 and 10 not only raised considerably over the other loops 11 and 12, and 13 and 14, but also above the bowed parts of the cross-connections. The result is, that when a jar 23 is inclosed between said clip-pairs of members, the bottom of the jar rests alone upon the four loops 7 and 8, and 9 and 10, on an infinitesimal point of the surface of each, and in like manner the under loops 11 and 12, and 13 and 14 rest upon the bottom 24 of the containing vessel 22 on infinitesimal points of the surface of each. As so held and separated from the bottom 24 a considerable distance, a complete circulation of water is permitted between the vessels, so that the jar is insulated from the bottom 24 and immersed throughout in an equally heated medium with consequent freedom from unequal contraction and breakage. Since there is considerable space under the jar, the water thereunder is free to move upwardly about the jar, by convection, to keep the contents of the jar equally heated.

The clip-members are held resiliently upon the jar by being bent over convergingly at their tops and wound at 16, 18 and 19 in close coils about an axis-pin 21, one member-end then being carried upwardly and bent into a hook or loop 20 which thus serves as a finger-hold whereby the device with the inclosed jar may be lifted and carried about. The coils act as springs, whereby the members 1, 2, 3 and 4 are yieldingly yet elastically impelled toward each other to thus grasp the opposite parts of the jar 23. The device may be used to inclose and hold jars of different sizes, and to permit them to be carried to and be immersed in the boiling water without danger to the user, and as conveniently removed therefrom, and are easily displaced from the jar.

Having described by invention, what I claim as new, and desire to secure by Letters Patent, is:

1. Jar-holding and spacing-means, comprising resiliently-connected spring-members, each having an integral cross-connection at its lower end with the cross-connections raised and directed inwardly and medially bowed downwardly, formed by first bending said members to form offset shoulders adapted to rest on the bottom of a containing vessel, and then being reversely bent to form other upwardly-projecting shoulders adapted to support the bottom of a jar clasped between said members.

2. Jar-holding and spacing-means, comprising resiliently-connected spring-members, each having an integral cross-connection at its lower end with the cross-connections raised and directed inwardly and medially bowed downwardly, formed by first bending said members to form offset shoulders adapted to rest on the bottom of a containing vessel, and then being reversely bent to form other upwardly-projecting shoulders adapted to support the bottom of a jar clasped between said members, the resilient-connection between the tops of said members being a cross-axis with the upper ends of the members coiled thereabout to form spring-coils adapted to yieldingly impel the members toward each other.

3. Jar-holding and spacing-means, comprising resiliently-connected spring-members, each having an integral cross-connection at its lower end with the cross-connections raised and directed inwardly and medially bowed downwardly, formed by first bending said members to form offset shoulders adapted to rest on the bottom of a containing vessel, and then being reversely bent to form other upwardly-projecting shoulders adapted to support the bottom of a jar clasped between said members, the resilient-connection between the tops of said members being a cross-axis with the upper ends of the members coiled thereabout to form spring-coils adapted to yieldingly impel the members toward each other, and the upper extremity of one of said members being of greater length and bent upwardly above said coils to form a finger-hold.

Signed at Waterloo, Iowa, this 5th day of June, 1913.

FRANK WILCOX.

Witnesses:
G. C. KENNEDY,
W. H. BRUNN.

---

Copies of this patent may be obtained for five cents each, by addressing the "Commissioner of Patents, Washington, D. C."